United States Patent
Yamada

(10) Patent No.: US 8,994,986 B2
(45) Date of Patent: Mar. 31, 2015

(54) PRINT CONTROL APPARATUS, PROGRAM AND METHOD OF DISPLAYING PRINT SETTING SCREEN

(75) Inventor: Kazutaka Yamada, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 713 days.

(21) Appl. No.: 13/048,451

(22) Filed: Mar. 15, 2011

(65) Prior Publication Data

US 2011/0228331 A1    Sep. 22, 2011

(30) Foreign Application Priority Data

Mar. 17, 2010    (JP) ................. 2010-060766

(51) Int. Cl.
    *G06F 3/12* (2006.01)
    *G06F 9/44* (2006.01)

(52) U.S. Cl.
    CPC .................... *G06F 9/4443* (2013.01)
    USPC .......................... 358/1.15; 358/1.1

(58) Field of Classification Search
    USPC .................. 358/1.15, 1.1
    See application file for complete search history.

(56) References Cited

U.S. PATENT DOCUMENTS

| | | | |
|---|---|---|---|
| 7,590,947 | B1 | 9/2009 | Gay et al. |
| 7,779,365 | B2 | 8/2010 | Fujita |
| 8,396,942 | B2 | 3/2013 | Ookuma et al. |
| 2002/0163540 | A1 | 11/2002 | Kishimoto |
| 2003/0067489 | A1 | 4/2003 | Candy Wong et al. |
| 2006/0136576 | A1 | 6/2006 | Ookuma et al. |
| 2006/0150117 | A1 | 7/2006 | Fujita |
| 2006/0238786 | A1 | 10/2006 | Sakura et al. |
| 2006/0253796 | A1 | 11/2006 | Wang et al. |
| 2007/0101289 | A1 | 5/2007 | Awada et al. |
| 2009/0228822 | A1 | 9/2009 | Miyata |
| 2009/0231353 | A1 | 9/2009 | Han |
| 2010/0192091 | A1 | 7/2010 | Oishi et al. |
| 2010/0238469 | A1 | 9/2010 | Nakagama |
| 2011/0154228 | A1* | 6/2011 | Kinoshita ................ 715/763 |
| 2013/0151998 | A1 | 6/2013 | Ookuma et al. |

FOREIGN PATENT DOCUMENTS

| | | |
|---|---|---|
| CN | 1759371 A | 4/2006 |
| CN | 1783088 A | 6/2006 |
| CN | 101297263 A | 10/2008 |
| JP | 06067828 | 3/1994 |
| JP | 2001-344051 | 12/2001 |

(Continued)

OTHER PUBLICATIONS

English Translation of JP2002032210A (see above), provided by JPO on Aug. 8, 2013.*

(Continued)

*Primary Examiner* — Martin Mushambo
(74) *Attorney, Agent, or Firm* — Banner & Witcoff, Ltd.

(57) ABSTRACT

A print control apparatus, a program, a method of displaying a print setting screen are provided. The print control apparatus includes a display device, an acquisition unit configured to acquire a size of a displayable area of the display device, a changing unit configured to change a size of a print setting screen related to a print setting according to the size of the displayable area, and a screen displaying unit configured to display the print setting screen changed by the changing unit on the display device.

15 Claims, 14 Drawing Sheets

(56) References Cited

FOREIGN PATENT DOCUMENTS

| | | | |
|---|---|---|---|
| JP | 2002032210 A | * | 1/2002 |
| JP | 2002328801 A | | 11/2002 |
| JP | 2003058716 A | | 2/2003 |
| JP | 2003108361 A | | 4/2003 |
| JP | 2006309352 A | | 11/2006 |
| JP | 2006331339 A | | 12/2006 |
| JP | 2007-115046 | | 5/2007 |
| JP | 2008-251046 | | 10/2008 |
| JP | 2008276693 A | | 11/2008 |
| JP | 2009080573 A | | 4/2009 |
| JP | 2009-217472 | | 9/2009 |
| JP | 2009224995 A | | 10/2009 |
| JP | 2010176320 | | 8/2010 |
| JP | 2010221422 | | 10/2010 |
| WO | 03017161 A1 | | 2/2003 |
| WO | WO 2010024358 A1 | * | 3/2010 |

OTHER PUBLICATIONS

First Office Action and Search Report issued in corresponding Chinese Patent Application No. 201110070620.9 dated May 6, 2013.
Notification of Reason for Refusal for Japanese patent application No. 2010-060766 mailed Jan. 10, 2012.
Extended European Search Report for application No. 11158322.5 mailed Jul. 25, 2011.

* cited by examiner

FIG. 10

| ITEMS | PRIORITY |
|---|---|
| DRIVE NAME | 1 |
| LINK BUTTON TO THE WEBSITE | 1 |
| COLOR TONE ICON | 2 |
| DETAILED SETTING BUTTON | 3 |
| PAPER TRAY SETTING | 4 | ized

PRINT CONTROL APPARATUS, PROGRAM AND METHOD OF DISPLAYING PRINT SETTING SCREEN

CROSS-REFERENCE TO RELATED APPLICATION

This application claims priority from Japanese Patent Application No. 2010-060766, filed on Mar. 17, 2010, the entire subject matter of which is incorporated herein by reference.

TECHNICAL FIELD

Aspects of the present invention relate to a print control apparatus which is configured to display a print setting screen related to a print setting, a program and a method of displaying the print setting screen.

BACKGROUND

Conventionally, when a print control apparatus such as a personal computer (PC) sends a print command to a print apparatus (such as a printer), a print setting screen is displayed on a display device of the print control apparatus. In the print setting screen, print conditions can be set and the print instructions can be input. The print setting screen is displayed by a program for the print apparatus (driver), which is stored in the print control apparatus. For example, JP-A-2009-217472 describes a print setting screen.

SUMMARY

However, the above-described print setting screen has the following problems. That is, the size and display content of the print setting screen are fixed, so that the print setting screen are displayed on the display device by using a predetermined number of dots (number of pixels). Therefore, depending on a display device provided in a print control apparatus, most part of the print setting screen is displayed beyond a displayable area of the display device, so that the usability is deteriorated.

Accordingly, an aspect of the present invention provides a print control apparatus for displaying a print setting screen which takes into account user operability, a program and a method of displaying the print setting screen.

According to an illustrative embodiment of the present invention, there is provided a print control apparatus comprising: a display device; an acquisition unit configured to acquire a size of a displayable area of the display device; a changing unit configured to change a size of a print setting screen related to a print setting according to the size of the displayable area; and a screen displaying unit configured to display the print setting screen changed by the changing unit on the display device.

According to another illustrative embodiment of the present invention, there is provided a computer-readable medium having a program stored thereon and readable by a print control apparatus including a display device, the computer program, when executed by the print control apparatus, causing the apparatus to perform operations comprising: acquiring a size of a displayable area of the display device; changing a size of a print setting screen related to a print setting according to the size of the displayable area; and displaying the print setting screen, the size of which is changed by the changing operation, on the display device.

According to a further illustrative embodiment of the present invention, there is provided a method of displaying a print setting screen related to a print setting on a display device, the method comprising: acquiring a size of a displayable area of the display device; changing a size of the print setting screen according to the size of the displayable area; and displaying the print setting screen, the size of which is changed by the changing step, on the display device.

According to the above configuration, a print control apparatus for displaying a print setting screen which takes into account user operability, a program and a method of displaying the print control screen are provided.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 10 is a drawing showing an example of a database storing an association between a display item and a reduction priority;

DETAILED DESCRIPTION

A print control apparatus according to an illustrative embodiment of the present invention will be described in detail with reference to the accompanying drawings. In the illustrative embodiment, a personal computer (PC) has a printer driver of a MFP (multi-function peripheral) installed therein.

[Overall Configuration of a Print System]

Figure 1:
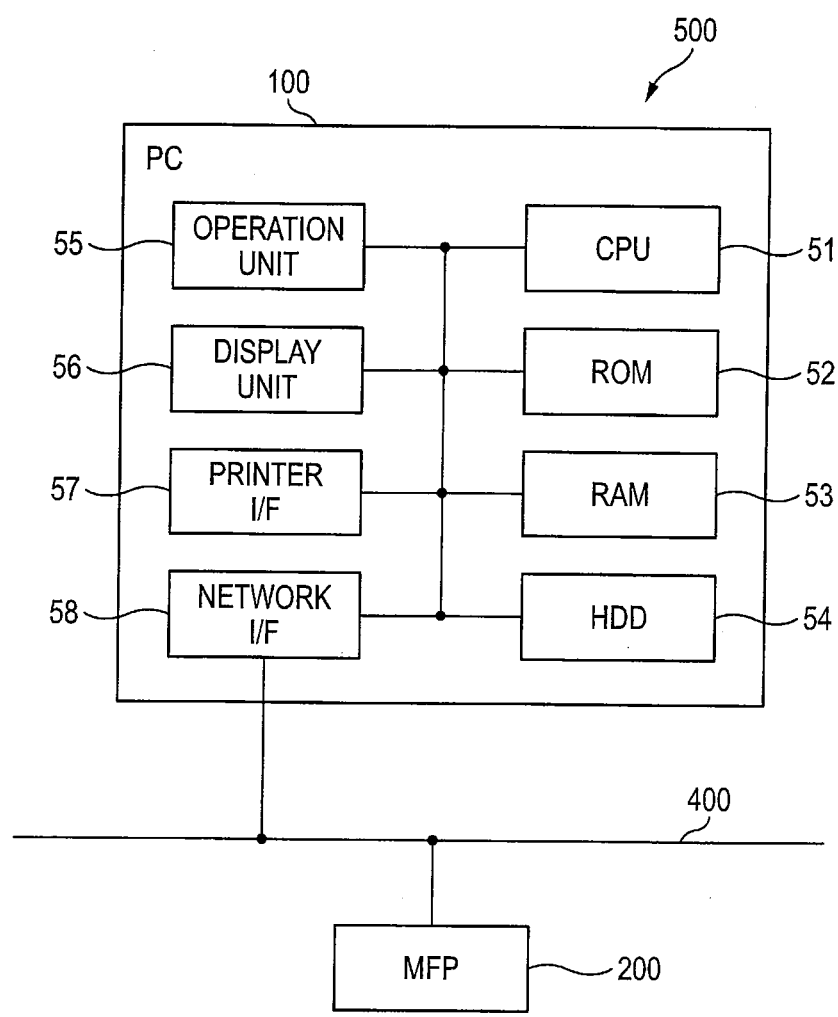
FIG. 1 is a block diagram showing a configuration of a print system according to an illustrative embodiment.

As shown in FIG. 1, a print system 500 according to an illustrative embodiment includes a MFP 200 having a print function and a PC 100 (an example of a print control apparatus) that inputs print data to the MFP 200. In the print system 500, the MFP 200 and the PC 100 are connected to a network 400.

It is noted that the number of a print apparatus and a PC included in the print system 500 is not limited to one. That is, any number of print apparatuses and PCs may be provided. In addition, other information processing apparatuses and image processing apparatuses may be connected to the network 400. Further, the MFP 200 may be directly connected to the PC 100, and also, the MFP 200 may be wirelessly connected to the PC 100.

[Configuration of the PC]

Next, the schematic configuration of the PC 100 will be described. As shown in FIG. 1, the PC 100 includes a CPU 51, a ROM 52, a RAM 53, an HDD 54, an operating unit 55 configured by a keyboard and a mouse, a display unit 56 (an example of a display device) configured by a liquid crystal display, a printer interface 57 and a network interface 58.

The HDD 54 stores an operating system (OS), a device driver for controlling various devices and an application program such as a word processor and a spreadsheet which has a print instruction function. The RAM 53 is used as a work area, from which various programs are read, or used as a storage area that temporarily stores data. Based on the program stored in the HDD 54, the CPU 51 executes various processes while storing the process result in the RAM 53.

The PC 100 is installed with a printer driver which is a control program of the MFP 200, as a device driver. The printer driver generates a print job according to a print instruction from the application program, and has a function to send the print job to the MFP 200.

In addition, the printer driver displays a dialog box related to a print setting (an example of a print setting screen, and hereinafter referred to as a print dialog) on the display unit 56. Users can make the settings related to print by operating the print dialog. For example, when a user inputs a print instruction, the print dialog is activated through the application program.

Figure 2:
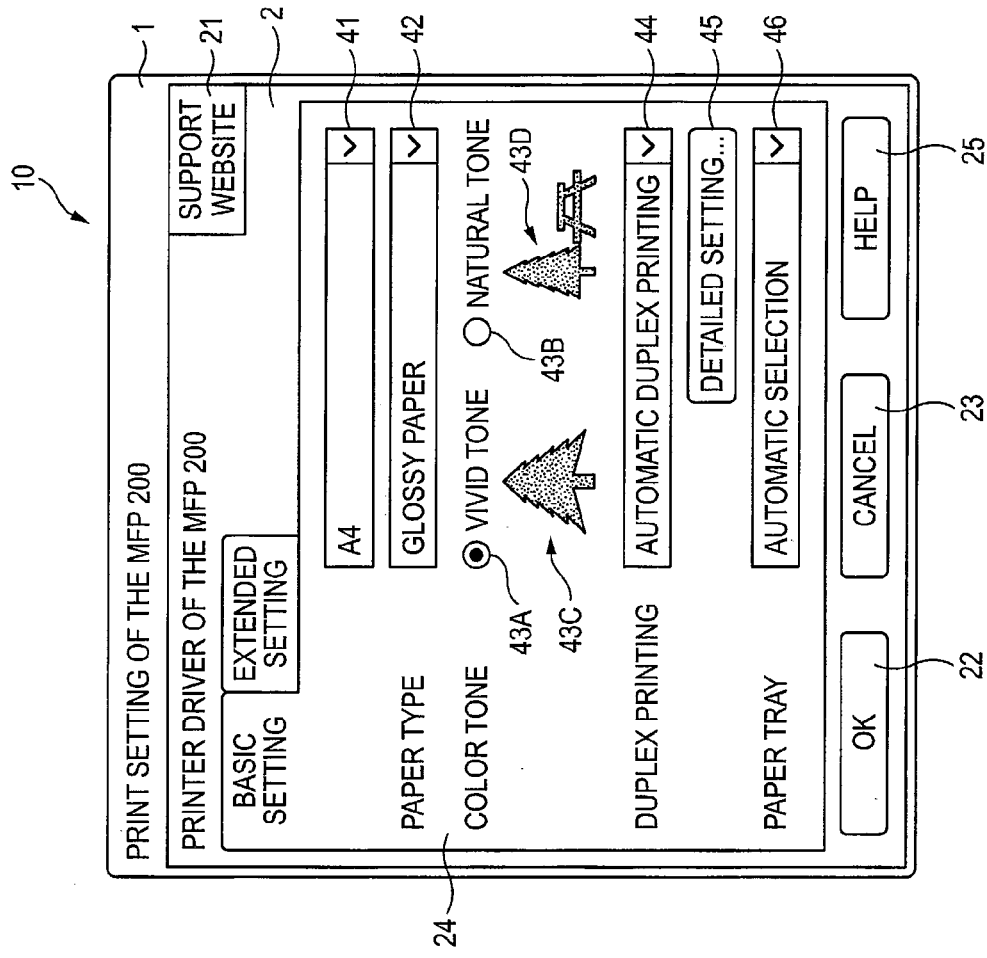
FIG. 2 is a drawing showing a print dialog of a PC.

FIG. 2 shows an initial screen of a print dialog 10 according to the illustrative embodiment. The print dialog 10 includes a title bar section 1 and a setting screen section 2. In the print dialog 10, a frame and an arrangement of operation items of the setting screen section 2 are fixed. That is, users cannot make any changes (for example, changing the frame size and moving the operation items by operating the mouse).

For example, a driver name, a link button 21 of a website, an OK button 22, a cancel button 23, a help button 25 that activates a help program, and a tab 24 where the operation items for the print setting are displayed are displayed on the setting screen section 2 of the print dialog 10. The tab 24 includes a "basic setting" page for a basic setting and an "extended setting" page for an extended setting.

In addition, various operation items for the print setting are displayed on the basic setting page of the tab 24. Specifically, in this illustrative embodiment, there are displayed a list box 41 for setting a paper size, a list box 42 for setting a paper type, radio buttons 43A, 43B for setting color tone, a list box 44 for setting duplex printing, a detailed setting button 45 for making detailed settings, and a list box 46 for setting a paper tray. In addition, an illustrated image (icon) corresponding to the settings is displayed on the basic setting page of the tab 24. Specifically, in this illustrative embodiment, in the setting of color tone, an icon 43C corresponding to "vivid" and an icon 43D corresponding to "natural" are displayed.

[Display Operation of the Print Dialog]

Next, the display operation of the print dialog 10 will be described. In the PC 100, when the printer driver receives a display request of the print dialog 10, the print dialog 10 is displayed on the display unit 56. When the print dialog 10 is displayed, the printer driver acquires the size of a displayable area of the display unit 56, and the size of the print dialog is adjusted to adapt to the size of the displayable area.

[Screen Displaying Process]

Figure 3:
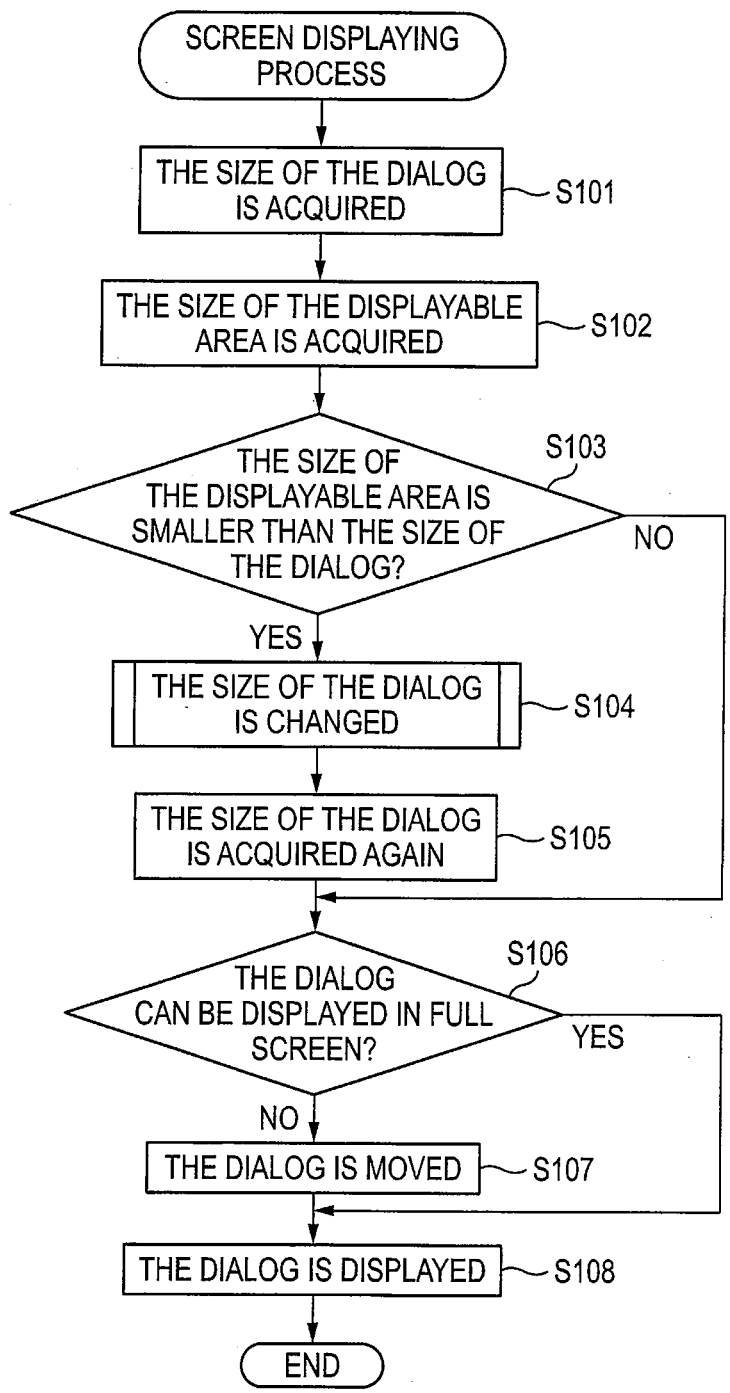
FIG. 3 is a flowchart showing a procedure of a screen displaying process.

Next, a screen displaying process (an example of a changing unit and a screen displaying unit) for realizing the above display operation will be described with reference to the flowchart of FIG. 3. The screen displaying process is executed by the printer driver installed in the PC 100 in response to the print dialog 10 being activated.

First, the size of the print dialog 10 is acquired (S101). Specifically, the printer driver stores the initial state of the print dialog 10, and acquires the sizes thereof in the vertical and horizontal directions at the initial state. Herein, the "size" means the number of pixels (the number of dots). Therefore, the actual size displayed on the display unit 56 varies according to a size per dot (resolution). For example, if users change the resolution of the display unit 56, since the size per dot changes, the size of the print dialog 10 actually displayed on the display unit 56 changes. However, since the pixels of the print dialog 10 do not change, the size of the print dialog 10, which is defined as explained above, does not change.

Next, the size of the displayable area of the display unit 56 is acquired (S102). Herein, the "size" of the displayable area also means the number of pixels, which is similar to that of the size of the print dialog 10. It is noted that S101 and S102 may be reversed.

Next, it is determined whether the size of the print dialog 10 is larger than that of the displayable area of the display unit 56 (S103). In the operation S103, both of the vertical direction and the horizontal direction are considered. If at least one of the vertical size and the horizontal size of the print dialog 10 is determined to be larger, S103 is determined as being "YES". In other words, in S103, it is determined whether the print dialog 10 falls within the displayable area of the display unit 56. If the print dialog 10 falls within the displayable area of the display unit 56 (NO at S103), it is not necessary to change the size of the print dialog 10, and then the process proceeds to S106.

On the other hand, if the print dialog 10 does not fall within the displayable area of the display unit 56 (YES at S103), a dialog changing process is executed to change the size of the print dialog 10 (S104). In S104, in order to make the print dialog 10 fall within the displayable area of the display unit 56, the size of the print dialog 10 is changed.

Here, the dialog changing process of S104 will be described with reference to the flowchart of FIG. 4. First, it is determined whether the printer driver itself has a plurality of display changing functions of the print dialog 10 (S201). The printer driver includes in advance at least one display changing function of the print dialog 10. The display changing functions include, for example, the change of an aspect ratio, the addition of a scroll bar, the reduction of operation items to be displayed and the addition of tab pages. Those changing functions will be described later in detail.

If the printer driver does not have a plurality of display changing functions (NO at S201), the single display changing function is selected (S211), and the process proceeds to S204. If the printer driver itself has a plurality of display changing functions (YES at S201), it is determined whether there are a plurality of display changing functions that make possible the full screen display of the print dialog 10 in the displayable area of the display unit 56 (S202). For example, when the size of the displayable area of the display unit 56 is considerably small, even if the aspect ratio is changed, it is difficult to realize the full screen display. Therefore, in this case, even if the printer drive has the changing function of the aspect ratio as a display changing function, the changing function of the aspect ratio is excluded from the display changing functions that make the full screen display possible.

If the printer driver does not have a plurality of display changing functions that make possible the full screen display (NO at S202), the single display changing function that makes the full screen display possible is selected (S221), and the process proceeds to S204. If there are a plurality of display changing functions that make the full screen display possible (YES at S202), the display changing function with highest priority is selected (S203). In the printer driver, a priority order of the display changing functions is set previously, and the display changing functions can be selected according to the priority order. The priority order, for example, can be set at factory (or it is incorporated into the printer driver), or can be set by a user.

After the changing functions have been selected by S203, S221 or S211, for the selected display changing functions, a process is executed to change the display mode of the print dialog 10 (S204). In the following, four processing examples (change of aspect ratio, addition of a scroll bar, reduction of operation items and addition of tag pages) in S204 will be described.

[Change of the Aspect Ratio]

Figure 5:
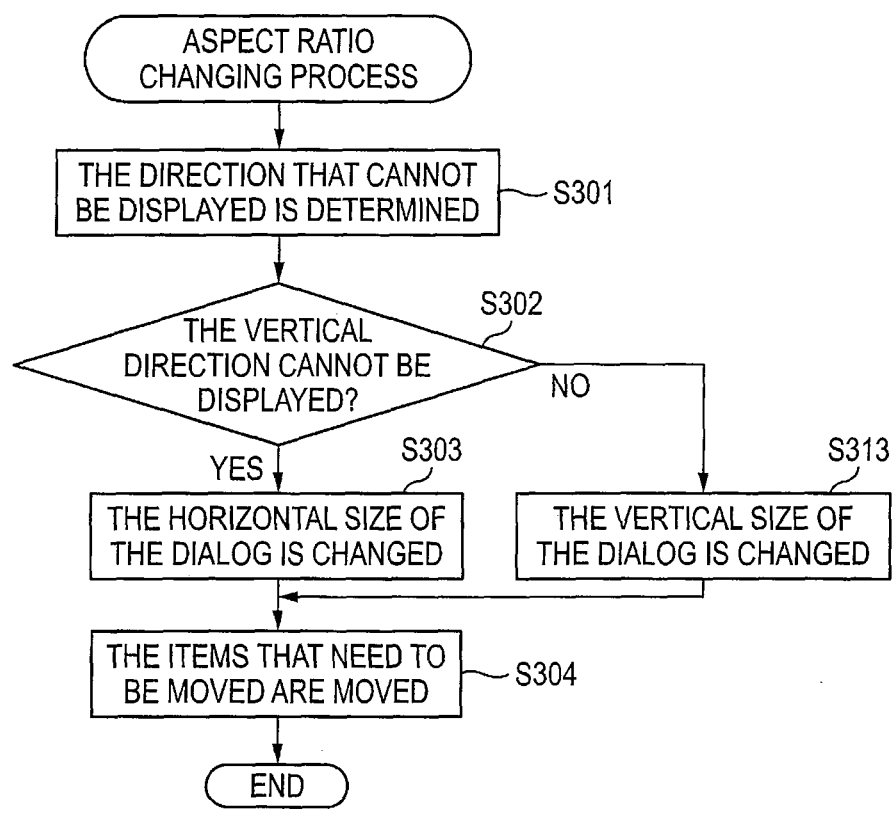
FIG. 5 is a flowchart showing a procedure of an aspect ratio changing process.

In the first process, the aspect ratio of the print dialog 10 is changed. An aspect ratio changing process that realizes the change of the aspect ratio will be described with reference to the flowchart of FIG. 5.

First, it is determined which one of the vertical direction and the horizontal direction of the print dialog 10 does not fall within the displayable area (S301). Next, it is determined whether the one that does not fall within the displayable area is the vertical direction (S302).

If the vertical direction does not fall within the displayable area (YES at S302), for the print dialog 10, the vertical direction is shortened, and the horizontal direction is lengthened accordingly. That is, the ratio of the horizontal size to the vertical size is changed to be higher (S303). In other words, the size of the vertical direction is shortened until it can fall within the displayable area, and the size of the horizontal direction is lengthened as necessary. For example, a size that is necessary for a space as a moving destination of an operation item which is hidden by shortening the size of the vertical direction is calculated as the size of the horizontal direction, and the size of the horizontal direction is lengthened by the necessary size. On the other hand, if the horizontal direction does not fall within the displayable area (NO at S302), for the print dialog 10, the horizontal direction is shortened, and the vertical direction is lengthened accordingly, or the ratio of the vertical size to the horizontal size is changed to be higher (S313). In other words, the size of the horizontal direction is shortened until it can fall within the displayable area.

After the size of the print dialog 10 is changed, the moving position of an operation item whose movement is necessary is calculated, and the item is moved (S304). That is, the operation item which is hidden due to the change of the size of the print dialog 10 is extracted, and the size that is used by the operation item is acquired. Thus, a possible moving destination position is calculated based on the acquired size and the size of a candidate area of the moving destination (moving destination candidate area). Thus, if the operation item falls within the moving destination candidate area, the moving destination candidate area is determined to be the moving destination. If the operation item does not fall within the moving destination candidate area, the next moving destination candidate area is calculated. Thus, for all the hidden operation items, the movement of the items is conducted.

Figure 6:
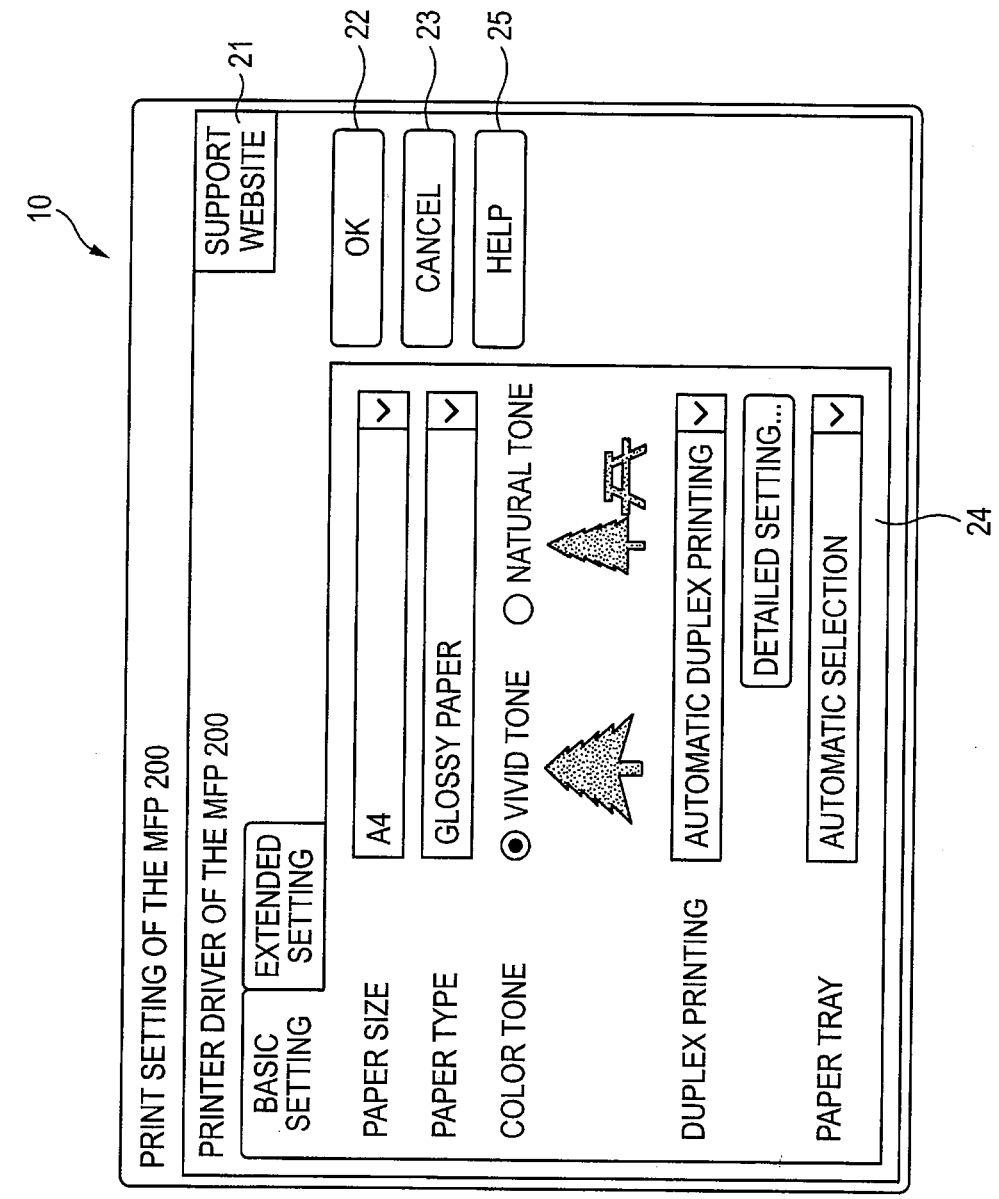
FIG. 6 is a drawing showing an example of a print dialog after the aspect ratio changing process.

FIG. 6 shows an example of a print dialog 10 that is changed to improve the ratio in the horizontal direction by the aspect ratio changing process. Compared to the print dialog 10 before the change (see FIG. 2), in the print dialog 10 shown in FIG. 6, the vertical size is shortened, and the horizontal size is lengthened. Thus, with the change of the horizontal length, the OK button 22, the cancel button 23 and the help button 25 provided at the bottom of the print dialog 10 before the change, move to the right side of the print dialog 10 after the change respectively. Therefore, even if the vertical size of the displayable area is smaller than the vertical size of the print dialog 10, the reduction in usability can be prevented.

[Addition of a Scroll Bar]

Figure 7:
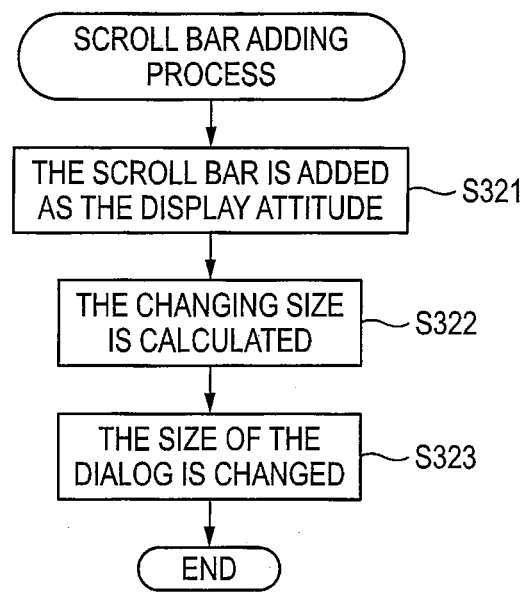
FIG. 7 is a flowchart showing a procedure of a scroll bar adding process.

In the second process, a scroll bar is added to the setting screen section 2 of the print dialog 10. A scroll bar adding process to realize the addition of the scroll bar will be described with reference to the flowchart of FIG. 7.

First, a scroll bar is added as a display attribute of the dialog box of the print dialog 10 (S321). When the attribute of the scroll bar is added, if the horizontal size of the setting screen section 2 is larger than the horizontal size of the print dialog 10, a horizontal scroll bar is added automatically to the bottom of the horizontal direction of the setting screen section 2. In addition, if the vertical size of the setting screen section 2 is larger than the vertical size of the print dialog 10, a vertical scroll bar is added automatically to the right side of the screen of the setting screen section 2.

Next, in order to make both the vertical direction and the horizontal direction to fall within the displayable area, the changing size of the print dialog 10 is calculated based on the size of the displayable area of the display unit 56 (S322). That is, in order to make the vertical size of the print dialog 10 to be shorter than the vertical size of the displayable area, and to further make the horizontal size of the print dialog 10 to be shorter than the horizontal size of the displayable area, the size of the print dialog 10 is calculated.

After that, the size of the print dialog 10 is changed based on the calculated size in S322 (S323). A scroll bar is added to the print dialog 10, the size of which is changed, especially reduced.

Figure 8:
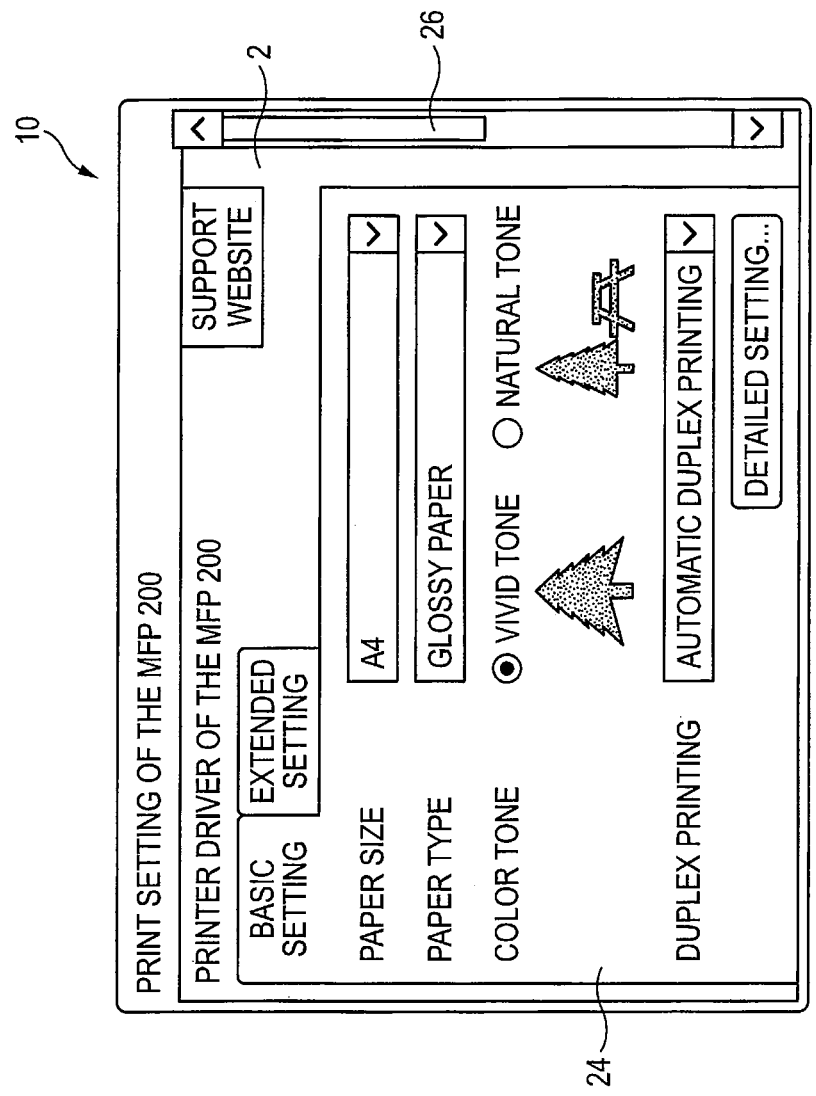
FIG. 8 is a drawing showing an example of a print dialog after the scroll bar adding process.

FIG. 8 shows an example of a print dialog 10 where the vertical size is shortened by the scroll bar adding process. In the print dialog 10, with the reduction of the horizontal size, the lower part of the setting screen section 2 become hidden (for example, OK button 22, cancel button 23 and help button 25 are hidden), and a vertical scroll bar 26 is added to the right side of the setting screen section 2. The operations of the hidden area can be conducted by scrolling the setting screen section 2 in the vertical direction with the vertical scroll bar 26.

In addition, in the scroll bar adding process according to the illustrative embodiment, the scroll bar that is scrolled in the setting screen section 2 are added. However, the present invention is not limited thereto. For example, a scroll bar can be added to the tab 24 and can be scrolled only in the page of the tab 24.

[Reduction of Operation Items]

Figure 9:
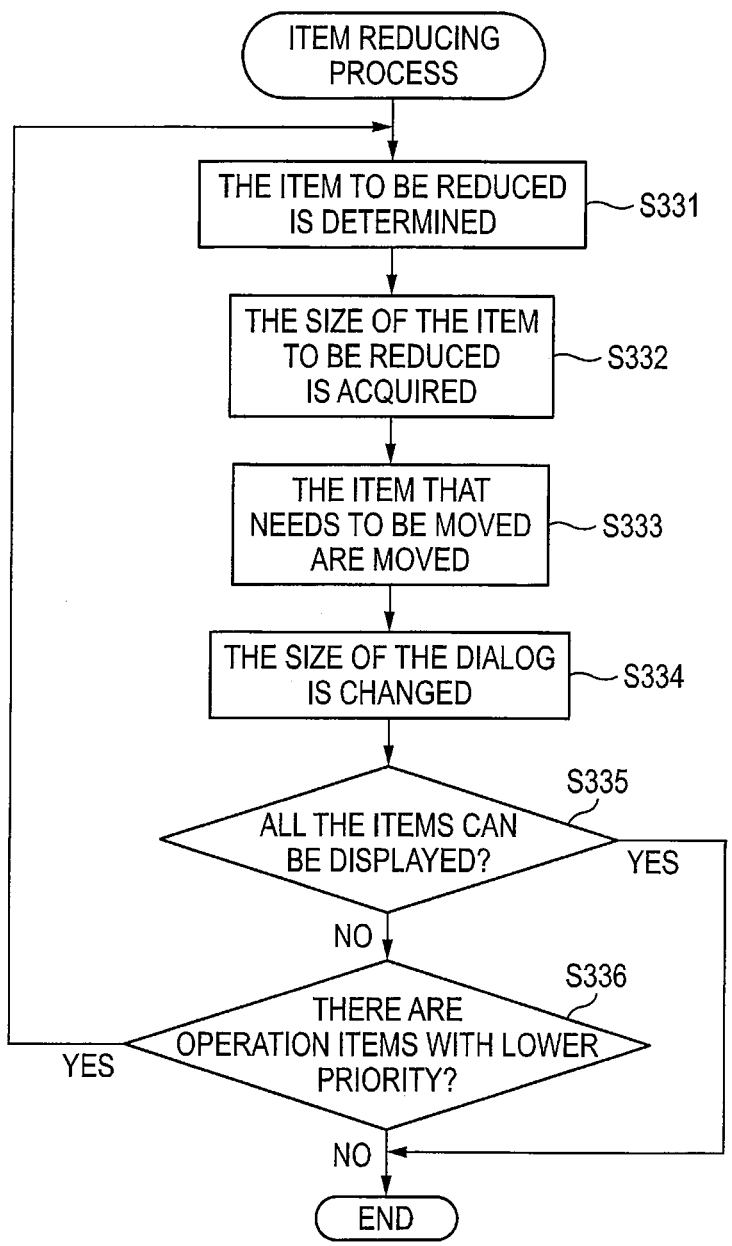
FIG. 9 is a flowchart showing a procedure of an item reducing process.

In the third process, the operation items in the setting screen section 2 of the print dialog 10 are reduced. An item reducing process to realize the reduction of operation items will be described with reference to the flowchart of FIG. 9.

First, the operation items to be reduced are determined (S331). Specifically, the printer driver stores the hidden priority corresponding to each display item, and uses the hidden priority when the object to be reduced is determined. FIG. 10 shows an example of the database for storing the association between the display items and the priorities. Regarding the priorities in the database, the less the value, the higher the hidden priority. Accordingly, in S331, the object to be reduced is determined sequentially from those with lower priority value. When there are multiple items the priorities of which are equal, the multiple items can become the object to be reduced simultaneously. The priority of each display item can be set in advance at factory (or it is incorporated into the printer driver), can be determined by the use frequency of each display item, or can be set by a user.

Next, the size of each operation item to be reduced is acquired (S332). Thus, in relation to the reduction of the operation items, operation items that need to be moved are extracted, and they are moved to suitable positions (S333). Then, the size of the print dialog 10 is changed (S334). In the size change of S334, the size is changed to such a size that all the remaining operation items can be included in the setting careen unit 2.

Next, it is determined whether all the operation items in the print dialog 10 after the change can be displayed in the displayable area of the display unit 56 (S335). If all the items can be displayed (YES at S335), the item reducing process ends. On the other hand, if all the items can not be displayed (NO at S335), it is determined whether there is an operation item with lower priority (S336). If there is an operation item with lower priority (YES at S336), the process returns to S331. The operation item with lower priority is determined to be the object to be reduced, and the size change of the print dialog 10 is repeated. On the other hand, if there is no operation item with lower priority (NO at S336), the item reducing process ends.

Figure 11:
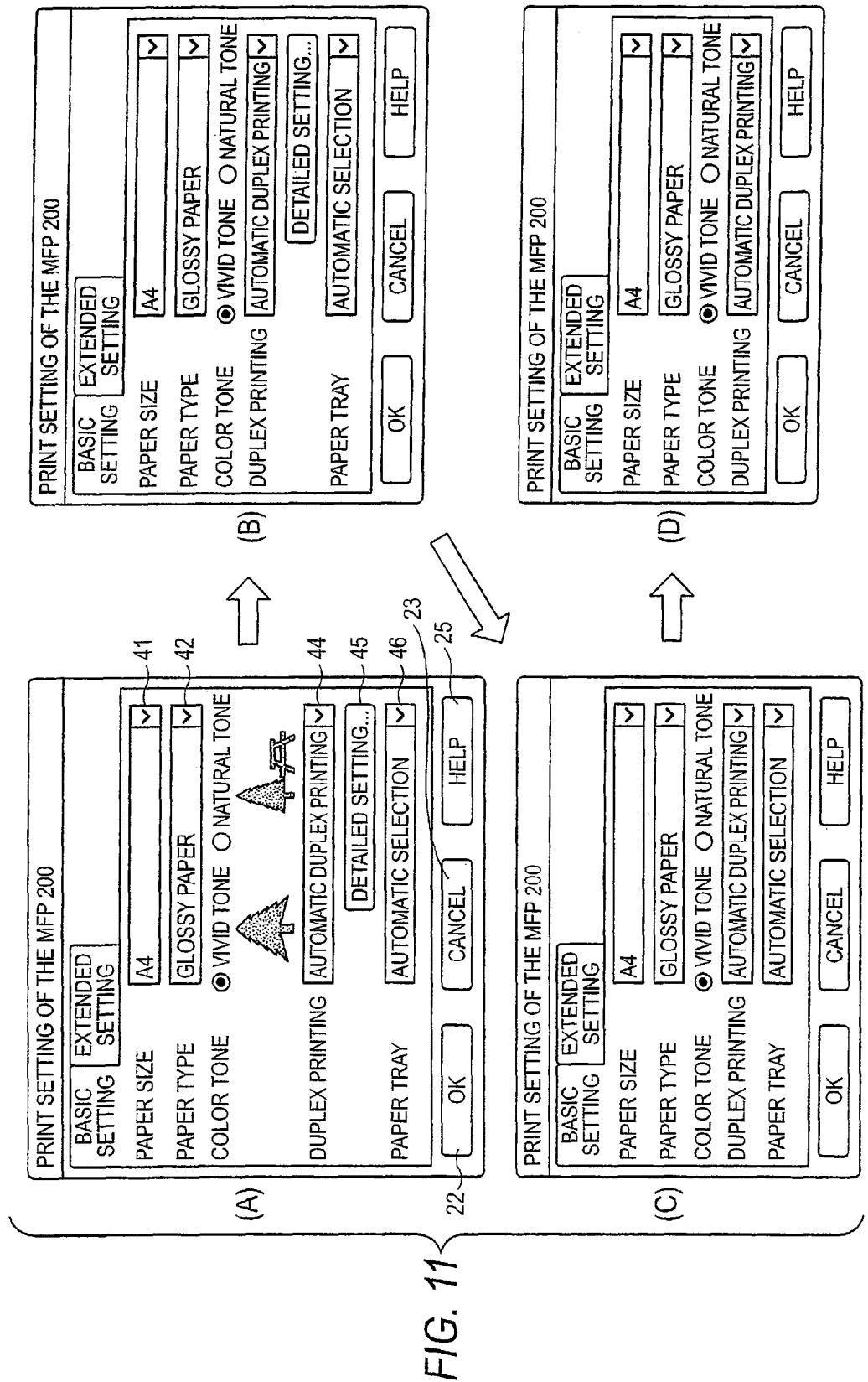
FIG. 11 is a drawing showing an example of a print dialog after the item reducing process.

FIG. 11 shows an example of the print dialog 10 where operation items are reduced based on the priority, and the size is changed with the reduction. FIG. 11(A) is an example where the items of priority 1 (driver name and link button 21) are hidden from the print dialog 10 shown in FIG. 2. FIG. 11(B) is an example where the items of priority 1 and the items of priority 2 (icon 43C and icon 43D) are hidden. FIG. 11(C) is an example where the items of priorities 1-2 and the items of priorities 3 (detailed setting button 45) are hidden. FIG. 11(D) is an example where the items of priorities 1-3 and the items of priority 4 (list box 46) are hidden. In the illustrative embodiment, the display modes are changed in the order of (A), (B), (C) and (D), such that all the operation items that should be displayed are displayed in the displayable area of the display unit 56. Therefore, the size of the print dialog 10 is changed to a suitable size according to the size of the displayable area.

[Addition of the Tab Page]

Figure 12:
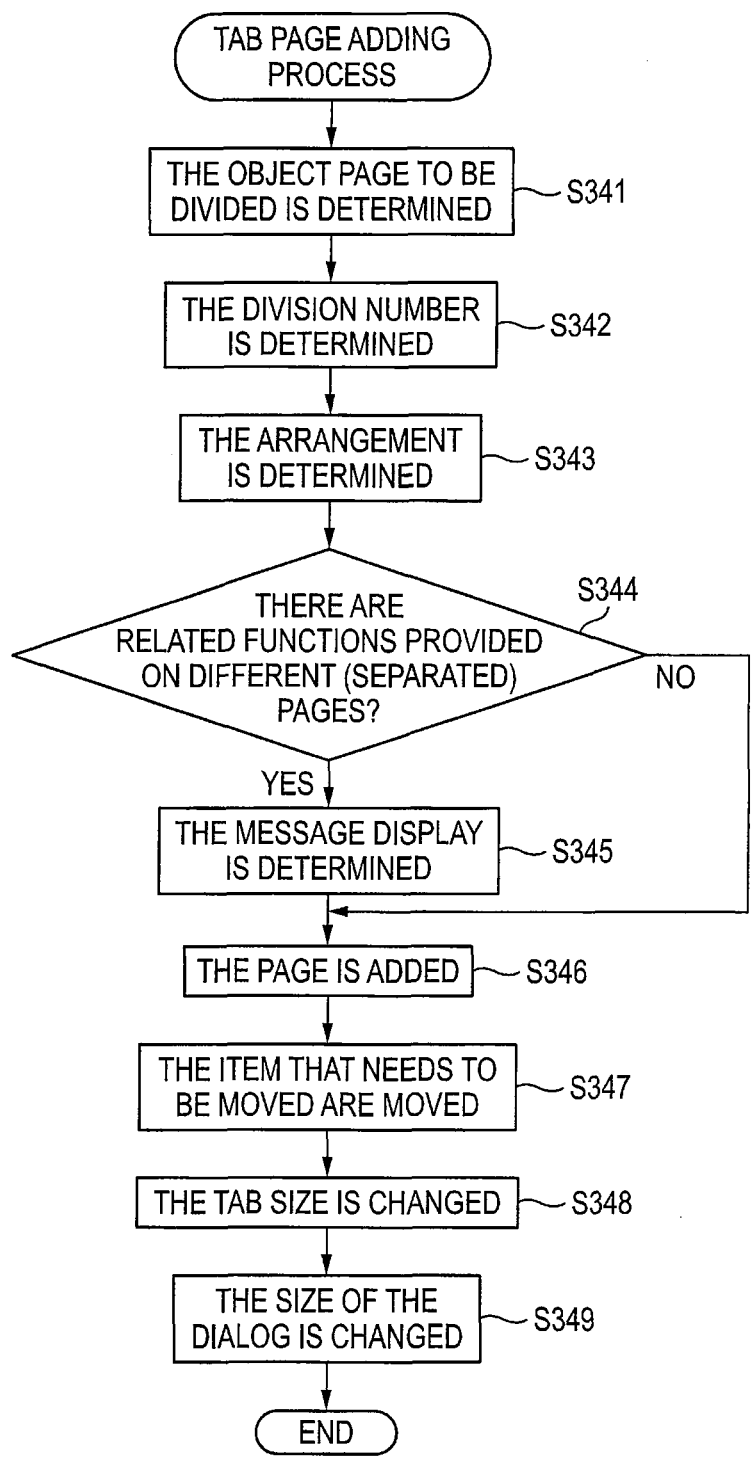
FIG. 12 is a flowchart showing a procedure of a tab page adding process.

In the fourth process, a new page is added to the tab 24, and several operation items are distributed into the new page. A tab page adding process to realize the distribution of the added page will be described with reference to the flowchart of FIG. 12.

First, in the tab 24, a page in which operation items are to be divided is determined (S341). For example, a page having the most operation items is determined to be an object to be divided. Furthermore, for the page of the object to be divided, it is determined how many pages the object is to be divided into (S342). Moreover, the distribution and arrangement of the operation items are determined in a case where a new page is added (S343).

Next, it is determined whether operation items which are set as related functions separately provided on several pages. The related functions are functions where the setting of one operation item is reflected in the display mode of another operation item. For example, when "A3" is selected as the sheet size, the setting of the operation item "duplex printing" can not be conducted, which is an exclusive function. The relationship between the operation items is set in advance.

If the related functions are separately provided on several pages (YES at S344), an operation item for displaying a message related to the related functions is determined (S345). For example, if there is an exclusive function described above, and the setting of paper size and the setting of duplex printing are provided on separate pages, if "A3" is selected as the paper size, a message showing "the duplex printing setting is invalid" is set. In other words, if the operation items related to each other are divided into separate pages, a message that replaces the related functions is displayed, so that the content of the automatic setting based on the related functions is notified.

After the message is set at S345, or there are no related functions between separate pages (NO at S344), a new page is added to the tab 24 (S346). Thus, the operation item that needs to be moved is moved from the existing page to the new page (S347). That is, for the operation items of the page that is the object to be divided in S341, the operation item that needs to be moved in S343 is removed from the original page, and the operation item corresponding to the removed item is created on a destination page. In addition, for the original page, after the operation item is removed, the rearrangement of the remaining operation items is changed as necessary. In particular, in order to compress the space of the removed operation items, the arrangement is changed.

Next, the size of the tab 24 is changed (S348). That is, because the number of the operation items is reduced in the original page, the size of the tab 24 can be reduced. Here, the size of the tab 24 is reduced. Then, with the size change of the tab 24, the size of the print dialog 10 is also changed (S349). In this process, although the number of the operation items displayed at once is reduced by the size-reduction of the tab 24, all the operation items can be set by switching the pages of the tab 24.

Figure 13:
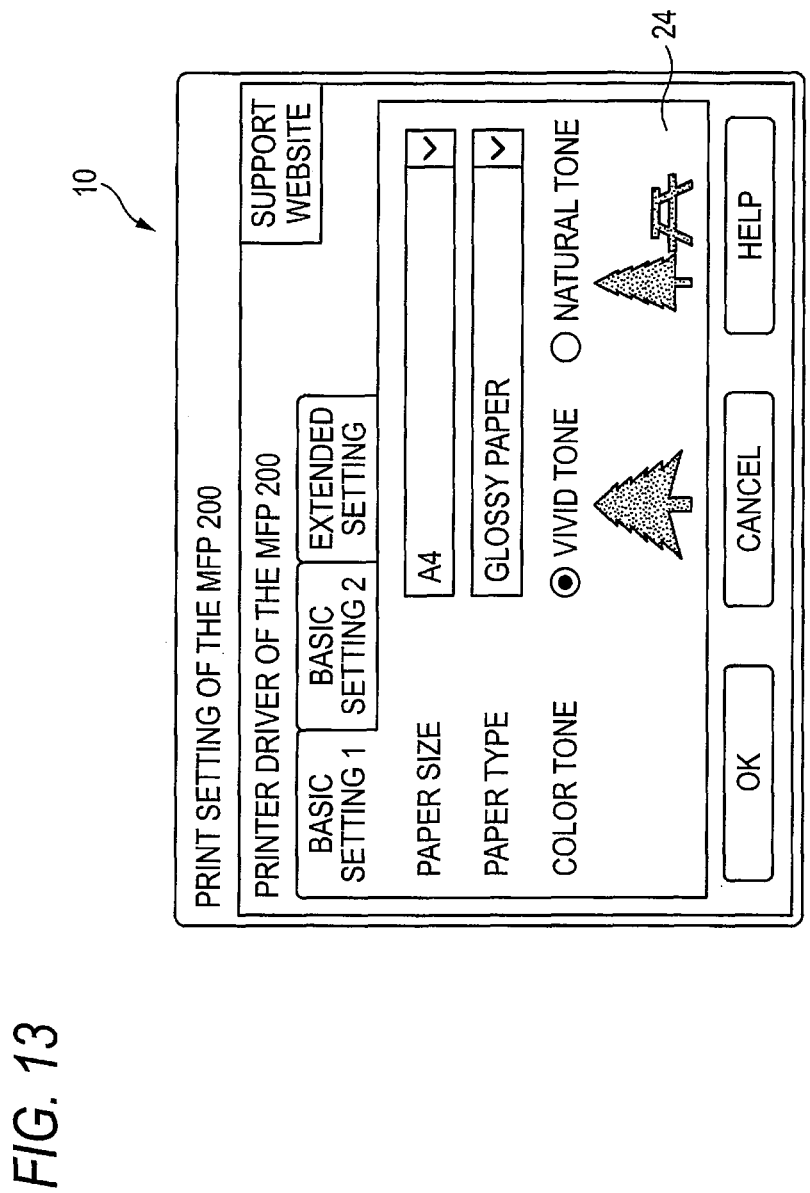
FIG. 13 is a drawing showing an example of a print dialog after the tab page adding process.

FIG. 13 shows an example of a print dialog 10 that divides the "basic setting" page of the tab 24 of the print dialog 10 shown in FIG. 2 into a "basic setting 1" page and a "basic setting 2" page. In the illustrative embodiment, among the "basic setting" pages, paper size, paper type and color tone are displayed on the "basic setting 1" page, while duplex printing and paper tray are displayed on the "basic setting 2" page. Thus, with the movement of each setting of the duplex printing and the paper tray, the vertical size of the tab 24 is reduced, and furthermore, the vertical size of the print dialog 10 is reduced.

Figure 4:
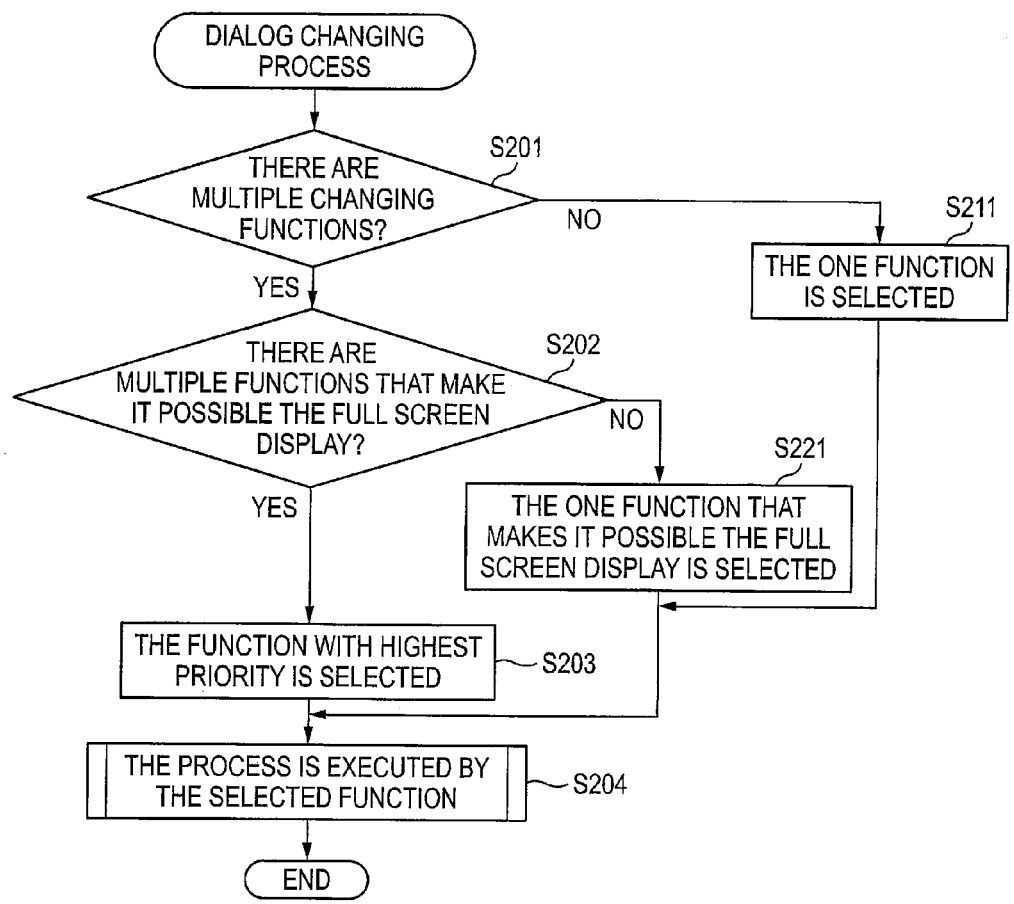
FIG. 4 is a flowchart showing a procedure of a dialog changing process.

Now, returning to the description of FIG. 4, among the four processes in S204, a selected process is executed and the size of the print dialog 10 is changed. Then, after the size of the print dialog 10 has been changed, the process returns to S104 of the screen displaying process of FIG. 3.

After the dialog changing process in S104, the size of the print dialog 10 after the change is acquired again (S105). Thus, when the print dialog 10 is displayed, it is determined whether all the print dialog 10 can be displayed in the displayable area of the display unit 56 at a position specified by the initial setting (S106).

Figure 14:
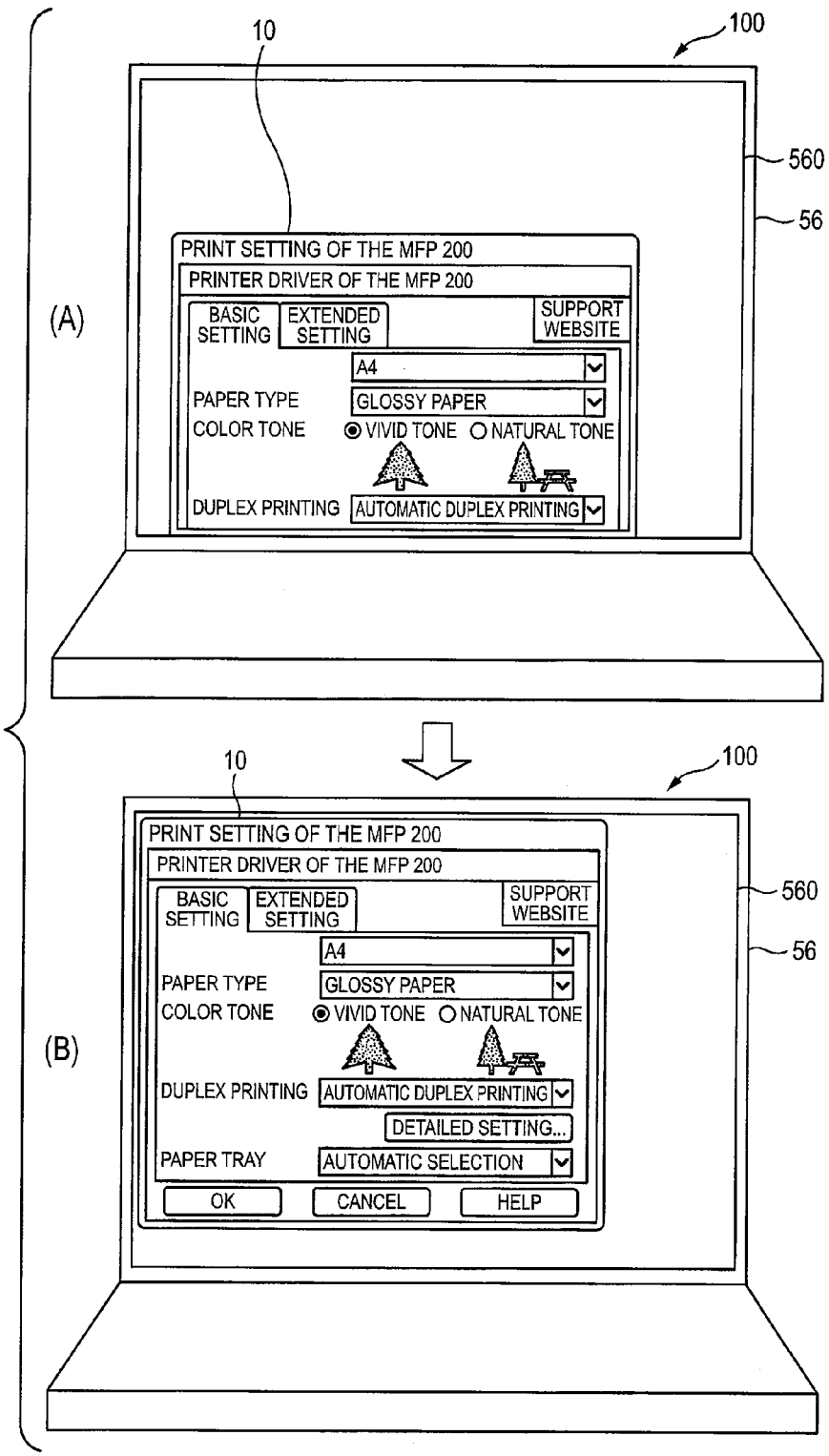
FIG. 14 is a drawing showing an example of a print dialog before and after the movement thereof.

If at least a portion of the print dialog 10 can not be displayed (NO at S106), the print dialog 10 is moved to a position where all the print dialog 10 can be displayed in the displayable area (S107). For example, as shown in FIG. 14(A), if a portion of the print dialog 10 is beyond a displayable area 560 of the display unit 56, in order to align the top-left position of the print dialog 10 with the top-left position of the displayable area 560, the print dialog 10 is moved, as shown in FIG. 14(B). Therefore, after the print dialog 10 has been displayed, users can save the time of moving the print dialog 10 to a position in which all the print dialog 10 can be seen.

After the position of the print dialog has been adjusted in S107, or if all the print dialog 10 can be displayed at the initial setting position (YES at S106), the print dialog 10 is displayed on the display unit 56 (S108). After S108, the screen displaying process ends.

In the PC 100 according to the above-described illustrative embodiment, the size of the print dialog 10 is changed according to the size of the displayable area of the display unit 56. Thus, by changing the size of the print dialog 10, even if, for example, the displayable area of the display unit 56 is small, the size of the print dialog 10 can be reduced to a size suitable for the displayable area, and then it can be displayed. Therefore, for the print dialog 10, it is expected that the unavailability in which an operation item cannot be seen and an operation cannot be conducted can be avoided.

While the present invention has been shown and described with reference to certain exemplary embodiments thereof, it will be understood by those skilled in the art that various changes in form and details may be made therein without departing from the spirit and scope of the invention as defined by the appended claims.

For example, the print apparatus is not limited to the MFP. Any apparatus that has a print function, such as a printer and a copier is also suitable for the present invention. In addition, for the print control apparatus that inputs print data, the present invention is not limited to the PC. The print control apparatus may be a compact information terminal such as a notebook, a PDA and a mobile phone.

In addition, in the above-described illustrative embodiment, the position of an operation item is calculated and the position (arrangement) is changed. However, the arrangement change of the operation item is not limited thereto. For example, a plurality of screens having different arrangements of the operation items are prepared in advance, and one screen may be suitably selected from the plurality of screens. In addition, the screens prepared in advance may include a detailed setting screen in which all settings are possible and a simple setting screen in which a portion of the operation items is not displayed. When the detailed setting screen does not fall within the displayable area of the display unit 56, the detailed setting screen may be changed to the simple setting screen by selecting between screens.

In addition, in the item reducing process according to the illustrative embodiment, the removed operation items are determined based on the hidden priority determined previously. However, the present invention is not limited thereto. For example, the removed objects may be determined randomly, and the arrangement of the remaining operation items may be freely changed depending on the size of the removed operation items.

In addition, in the above-described illustrative embodiment, regarding the display changing functions, the process is executed by selecting only one of the four display changing functions. However, the process may be executed by selecting a plurality of display changing functions. For example, while the aspect ratio is changed, the scroll bar is added. Further, operation items may simply be removed as necessary. Furthermore, the pages of the tab 24 may also be added as necessary.

In addition, in the above-described illustrative embodiment, the screen displaying process is executed when the print dialog 10 is activated. However, the present invention is not limited thereto. For example, the screen displaying process may be executed when the resolution is changed.

What is claimed is:

1. A print control apparatus comprising:
a display device;
a processor; and
memory storing computer readable instructions that, when executed by the processor, cause the print control apparatus to:
determine a first size of a displayable print setting screen related to a print setting, the print setting screen including a first page comprising a plurality of operation items;
acquire a size of a displayable area of the display device;
determine a manner in which to display the print setting screen based on the acquired size of the display area, including:
determining a second size of the print setting screen according to the size of the displayable area, the second size being a smaller size relative to the first size;
determining that a second page is to be added to the print setting screen based on the smaller size; and
determining a first operation item to be maintained on the first page and a second operation item to be moved from the first page to the second page;
display the print setting screen, including the first page overlapped with the second page, in the second size, the second page including the second operation item;
when a setting of the first operation item in the first page, which affects the setting of the second operation item added to the second page, is selected by a user, display a message showing that the setting of the first operation item affects the setting of the second operation item; and
when the setting of the first operation item in the first page is not selected by a user, not display the message showing that the setting of the first operation item affects the setting of the second operation item.

2. The print control apparatus according to claim 1, wherein the instructions, when executed by the processor, further cause the print control apparatus to change an aspect ratio of the print setting screen and an arrangement of one or more of the plurality of operation items within the print setting screen.

3. The print control apparatus according to claim 1, wherein the instructions, when executed by the processor, further cause the print control apparatus to change a position of the print setting screen in the displayable area.

4. The print control apparatus according to claim 1, wherein displaying the print setting screen in the second size includes displaying a scroll bar for moving a display area in the print setting screen.

5. The print control apparatus according to claim 1, wherein each of the operation items to be displayed on the print setting screen has a hidden priority, and
wherein determining the manner in which the print setting screen is to be displayed includes reducing a number of operation items to be displayed on the print setting screen by hiding an operation item having a lower priority prior to hiding an operation item having a higher priority.

6. The print control apparatus according to claim 1, wherein determining the manner in which to display the print setting screen includes adding a number of pages required to allow the print setting screen to be displayed on the display device without scrolling.

7. The print control apparatus according to claim 1, wherein, in a case where the first operation item in the first page is related to paper size and the second operation item in the second page is related to duplex printing, and a setting of the paper size is selected, which affects a setting of the duplex printing, the displayed message indicates that the setting of the paper size affects the setting of the duplex printing.

8. The print control apparatus according to claim 1, wherein the first operation item is related to a function which is exclusive to a function related to the second operation item.

9. A non-transitory computer-readable medium storing instructions that, when executed by a print control apparatus having a display device, cause the print control apparatus to perform operations comprising:
  determine a first size of a displayable print setting screen related to a print setting, the print setting screen including a first page comprising a plurality of operation items;
  acquire a size of a displayable area of the display device;
  determine a manner in which to display the print setting screen based on the acquired size of the display area, including:
    determining a second size of the print setting screen according to the size of the displayable area, the second size being a smaller size relative to the first size;
    determining that a second page is to be added to the print setting screen based on the smaller size; and
    determining a first operation item to be maintained on the first page and a second operation item to be moved from the first page to the second page;
  display the print setting screen, including the first page overlapped with the second page, in the second size, the second page including the second operation item;
  when a setting of the first operation item in the first page, which affects the setting of the second operation item added to the second page, is selected by a user, display a message showing that the setting of the first operation item affects the setting of the second operation item; and
  when the setting of the first operation item in the first page is not selected by a user, not display the message showing that the setting of the first operation item affects the setting of the second operation item.

10. A method of displaying a print setting screen related to a print setting on a display device, the method comprising:
  determining a first size of a displayable print setting screen related to a print setting, the print setting screen including a first page comprising a plurality of operation items;
  acquiring a size of a displayable area of the display device;
  determining a manner in which to display the print setting screen based on the acquired size of the display area, including:
    determining a second size of the print setting screen according to the size of the displayable area, the second size being a smaller size relative to the first size;
    determining that a second page is to be added to the print setting screen based on the smaller size; and
    determining a first operation item to be maintained on the first page and a second operation item to be moved from the first page to the second page;
  displaying the print setting screen, including the first page overlapped with the second page, in the second size, the second page including the second operation item; and
  causing, by a user-selection of a setting of the first operation item in the first page, which affects the setting of the second operation item to be added to the second page, a display of a message showing that the setting of the first operation item affects the setting of the second operation item.

11. The method according to claim 10, further comprising: changing an aspect ratio of the print setting screen and an arrangement of one or more of the plurality of operation items within the print setting screen when displaying the print setting screen in the second size.

12. The method according to claim 10, further comprising: changing a position of the print setting screen in the displayable area.

13. The method according to claim 10, wherein determining the manner in which to display the print setting screen includes reducing a number of operation items to be displayed on the print setting screen.

14. The method according to claim 13, wherein displaying the print setting screen in the second size includes displaying a scroll bar for moving a display area in the print setting screen.

15. The method according to claim 13, wherein each of the operation items to be displayed on the print setting screen has a hidden priority, and wherein the method further comprises:
  reducing a number of operation items displayed on the print setting screen by hiding an operation item having a lower priority prior to hiding an operation item having a higher priority.

* * * * *